United States Patent
Pinson

(10) Patent No.: US 6,622,420 B1
(45) Date of Patent: Sep. 23, 2003

(54) ROLLER WEIGHT FOR FISHING

(76) Inventor: Craig L. Pinson, 1262 Monte-Tesoro Dr., Cottonwood, AZ (US) 86326

( * ) Notice: Subject to any disclaimer, the term of this patent is extended or adjusted under 35 U.S.C. 154(b) by 0 days.

(21) Appl. No.: 10/187,344

(22) Filed: Jul. 2, 2002

(51) Int. Cl.[7] ............................................. A01K 91/00
(52) U.S. Cl. ...................................... 43/43.1; 43/44.96
(58) Field of Search ...................... 43/9.1, 9.5, 42.39, 43/43.12, 43.13, 43.14, 44.96, 44.97, 43.1; D22/145, 126

(56) References Cited

U.S. PATENT DOCUMENTS

| | | | |
|---|---|---|---|
| 2,170,067 A | | 8/1939 | Stephen |
| 2,623,320 A | * | 12/1952 | Bowman .................... 43/42.74 |
| 2,957,267 A | * | 10/1960 | Dempsey .................... 43/43.12 |
| 3,057,110 A | * | 10/1962 | Michael ...................... 43/43.12 |
| 3,120,715 A | * | 2/1964 | Long ........................... 43/43.1 |
| 3,253,363 A | * | 5/1966 | Steehn ........................ 43/42.13 |
| 3,413,751 A | * | 12/1968 | Biddle ........................ 43/44.97 |
| 3,458,947 A | | 8/1969 | Ross |
| 3,461,597 A | * | 8/1969 | Hobson ...................... 43/43.13 |
| 3,771,252 A | * | 11/1973 | Odenwald .................. 43/44.97 |
| 4,060,927 A | | 12/1977 | Haun et al. |
| 4,248,002 A | * | 2/1981 | McNellis .................. 242/397.1 |
| 4,351,127 A | * | 9/1982 | Mitchell ....................... 43/104 |
| 4,381,617 A | * | 5/1983 | McSweeny, Jr. ................ 43/14 |
| 4,663,879 A | * | 5/1987 | Bergeron, Jr. ................. 43/4.5 |
| 4,697,373 A | * | 10/1987 | May .............................. 43/9.5 |
| 4,750,289 A | * | 6/1988 | Rossa ......................... 43/44.96 |
| 4,771,565 A | * | 9/1988 | Shepherd ..................... 43/43.1 |
| 5,253,447 A | | 10/1993 | Rhinehart |
| 5,878,525 A | | 3/1999 | Metzler |
| 5,887,381 A | * | 3/1999 | Stephenson ................ 43/43.15 |
| 6,047,493 A | | 4/2000 | Strampe |

* cited by examiner

Primary Examiner—Peter M. Poon
Assistant Examiner—Susan Piascik
(74) Attorney, Agent, or Firm—Jacobson Holman PLLC

(57) ABSTRACT

A cylindrical or ball shaped roller weight rotatably mounted on a cross piece of a U-shaped portion of a wire frame with the free ends of the opposed arms of the U-shaped portion terminating in two arm extensions intersecting at an apex in an angle of approximately 90 degrees. At the intersection of the two arm extensions, an optional swivel may be included between the intersecting arm extensions and include an eyelet for connection to a fishing line. The optional swivel facilitates twisting and turning motion of the roller weight as it encounters an uneven terrain along the bottom surface of the body of water.

11 Claims, 3 Drawing Sheets

ROLLER WEIGHT FOR FISHING

FIELD OF THE INVENTION

The present invention relates to a rotatably mounted elongated, cylindrical weight for rolling across subsurface terrain in a body of water.

BACKGROUND OF THE INVENTION

Sinkers or weights used for fishing lines are used for different types of fishing. The most commonly used weights are available in various sizes, usually attached to the fishing line. The function of the sinker or weight is to reduce the buoyancy of a fishing lure dependant upon the type of fishing.

Usually, the weight of the sinker overcomes the buoyancy force of the fishing lure to force the fishing lure below the surface of a body of water. An increase in weight increases the tendency of the fishing lure to gravitate towards the bottom of the body of water.

Oftentimes it is desirous that the fishing lure travel near the bottom of the body of water. However, while attempting to locate the fishing lure adjacent to the bottom of the body of water, the sinker or even the fishing lure contacts the bottom of the body of water. At the bottom of the body of water, various obstacles and uneven terrain are encountered. The obstacles may be snagged by the hook of the fishing lure or even engaged by sinker weight so as to hang up the fishing line and force the fisherperson to spend their time attempting to recover the entangled fishing lure and/or sinker weight from the bottom of the body of water. This is a frustrating and time consuming distraction from the otherwise peaceful and enjoyable leisure activity of fishing.

SUMMARY OF THE INVENTION

Accordingly, one of the objects of the present invention is to avoid the entanglement of the fishing lure and/or sinker weight with an uneven terrain located at the bottom of a body of water.

This object is achieved by the use of a cylindrical or ball shaped roller weight rotatably mounted on a cross piece of a U-shaped portion of a wire frame with the free ends of the opposed arms of the U-shaped portion terminating in two arm extensions intersecting at an apex in an angle of approximately 90 degrees. At the intersection of the two arm extensions, an optional swivel may be included between the intersecting arm extensions and include an eyelet for connection to a fishing line. The optional swivel facilitates twisting and turning motion of the roller weight as it encounters an uneven terrain along the bottom surface of the body of water.

The interconnection between the eyelet and the fishing line can be such that the eyelet is at the terminal end of the fishing line. The fishing lure may then be secured directly to the fishing line by a swivel connection or a swivel connection connected to the fishing line may connect with a lead which terminates in a fishing lure. Alternatively, the eyelet can be secured to the fishing line spaced from the terminal end of the fishing line. A fishing lure can then be secured to the end of the fishing line.

All of these various arrangements, rely upon the principle of the roller weight being rotatably mounted on a wire frame such that the roller weight may traverse uneven terrain at the bottom surface of a body of water. The wire frame can be made of nickel, brass, stainless steel or other similar materials. The roller weight can also be made of stainless steel, nickel, brass or other dense materials.

The thickness of the wire will be dependent upon the weight of a roller weight. Similarly, the dimensioning of the wire frame will be proportionate to the size of the roller weight. For example, a $1/32$ ounce weight would require a 0.032 inch diameter wire, whereas a 100 pound weight would require a 0.5 inch diameter wire.

A preferred size of a roller weight would be $5/8$ inches long with a diameter of $1/4$ inch and proportionally increased in size according to the weight of the roller weight and frame size. It is critical that there be at least $1/8$ of an inch clearance at the top and bottom surfaces of the cylindrical roller weight so as to provide a clearance between the intersection of the cross piece and the arms forming the U-shaped portion of the wire frame. Also, at least $1/16$ of an inch clearance should be formed between the terminal end of the legs of the U-shaped portion and the connection to the arm extensions so as to provide free rolling of the cylindrical roller weight on the wire frame.

The roller weight of the present invention is designed for less drag and friction providing a smooth retrieval of a fishing line and increased sensitivity. The roller weight may be used during casting, jigging, trolling, bouncing and drifting.

It is therefore another object of the present invention to provide a rotatably mounted weight on a wire frame for traversing an uneven terrain at the bottom of a body of water.

It is yet another object of the present invention to provide a rotatably mounted weight on a wire frame for traversing an uneven terrain at the bottom of a body of water with the roller weight mounted on a U-shaped portion of the wire frame.

It is still yet another object of the present invention to provide a rotatably mounted weight on a wire frame for traversing an uneven terrain at the bottom of a body of water with the roller weight mounted on a U-shaped portion of the wire frame with the U-shaped portion terminating in arm extensions intersecting and connected to an eyelet for mounting the wire frame on a fishing line.

It is still yet another object of the present invention to provide a rotatably mounted weight on a wire frame for traversing an uneven terrain at the bottom of a body of water with the roller weight mounted on a U-shaped portion of the wire frame with the U-shaped portion terminating in arm extensions intersecting and connected to an eyelet for mounting the wire frame on a fishing line with a swivel connector extending between the eyelet and the terminal ends of the wire arm extensions of the wire frame.

It is still yet another object of the present invention to provide a rotatably mounted weight on a wire frame for traversing an uneven terrain at the bottom of a body of water with the roller weight mounted on a U-shaped portion of the wire frame with the U-shaped portion terminating in arm extensions intersecting and connected to an eyelet for mounting the wire frame on a fishing line with a swivel connector extending between the eyelet and the terminal ends of the wire arm extensions of the wire frame with the wire frame secured at either a terminal end of a fishing line or adjacent to the end of the fishing line with a fishing lure being mounted at the terminal end of the fishing line or spaced from the eyelet of the wire frame.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
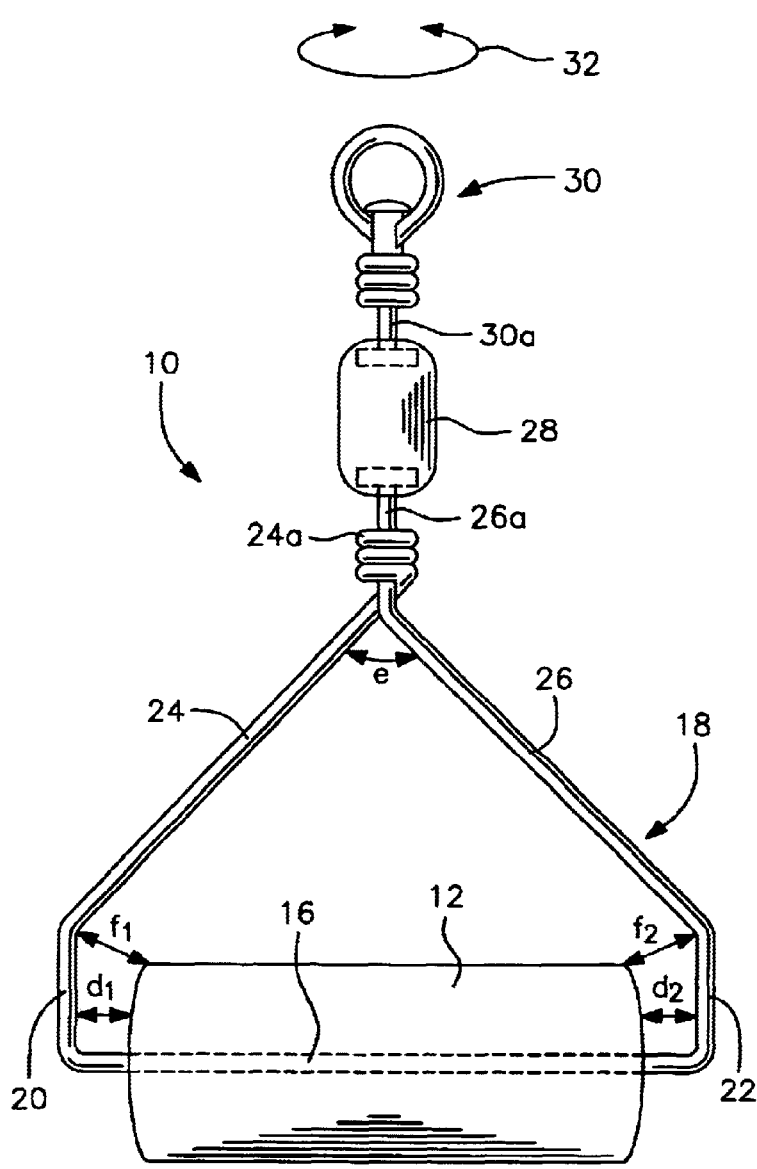
FIG. 1 is a front view of a roller weight rotatably mounted on a wire frame having a swivel connected to an eyelet for securing the wire frame to a fishing line.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
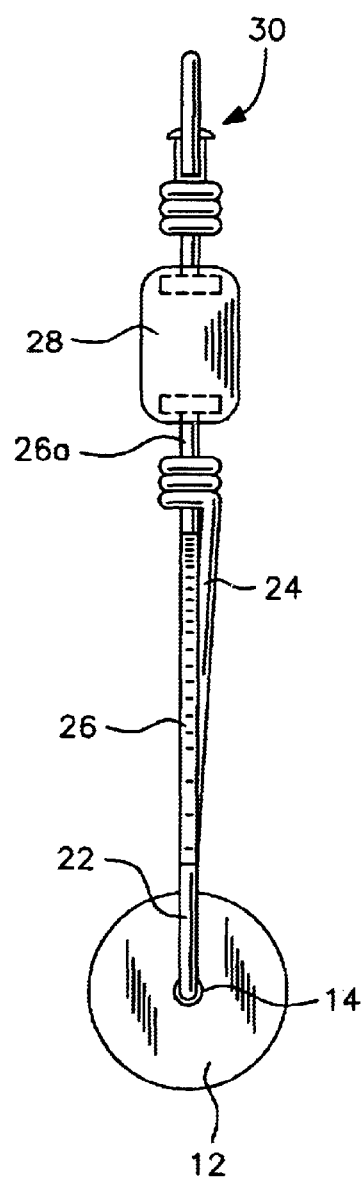
FIG. 2 is a side view of the roller weight on a wire frame as shown in FIG. 1.

With reference to the drawings, in general, and to FIGS. 1 and 2, in particular, a roller weight assembly for fishing embodying the teachings of the subject invention is generally designated as 10. With reference to its orientation in FIG. 1, the roller weight assembly 10 includes a cylindrical elongated weight 12 having a central opening 14 through which extends a crosspiece 16 of a U-shaped portion of wire frame 18. The U-shaped portion includes crosspiece 16 and arms 20, 22 located at opposite ends of crosspiece 16. A separation distance $d_1$, $d_2$, with a minimum separation distance between the ends of the roller 12 and the arms 20, 22 is 1/16 inch.

At the opposite ends of arms 20, 22, from the end connected to the crosspiece 16, are located arm extensions 24, 26, respectively. Arm extensions 24, 26 intersect at an angle "e" of approximately 90 degrees. Also, a separation distance from the intersection of arms 20 and arm extension 24 and arm 22 and arm extension 26 as indicated by $f_1$ and $f_2$ must be at least 1/16 of an inch so as to always provide free rolling of the roller weight 12.

End 24a of arm extension 24 is wrapped around end 26a of arm extension 26 to complete the wire frame 18. A swivel connector 28 is connected to end 26a on one side and to an end 30a of eyelet assembly 30 on an opposite side. Eyelet 30 and wire frame 18 are thereby able to rotate 360 degrees with respect to each other as indicated by arrow line 32.

Figure 6:
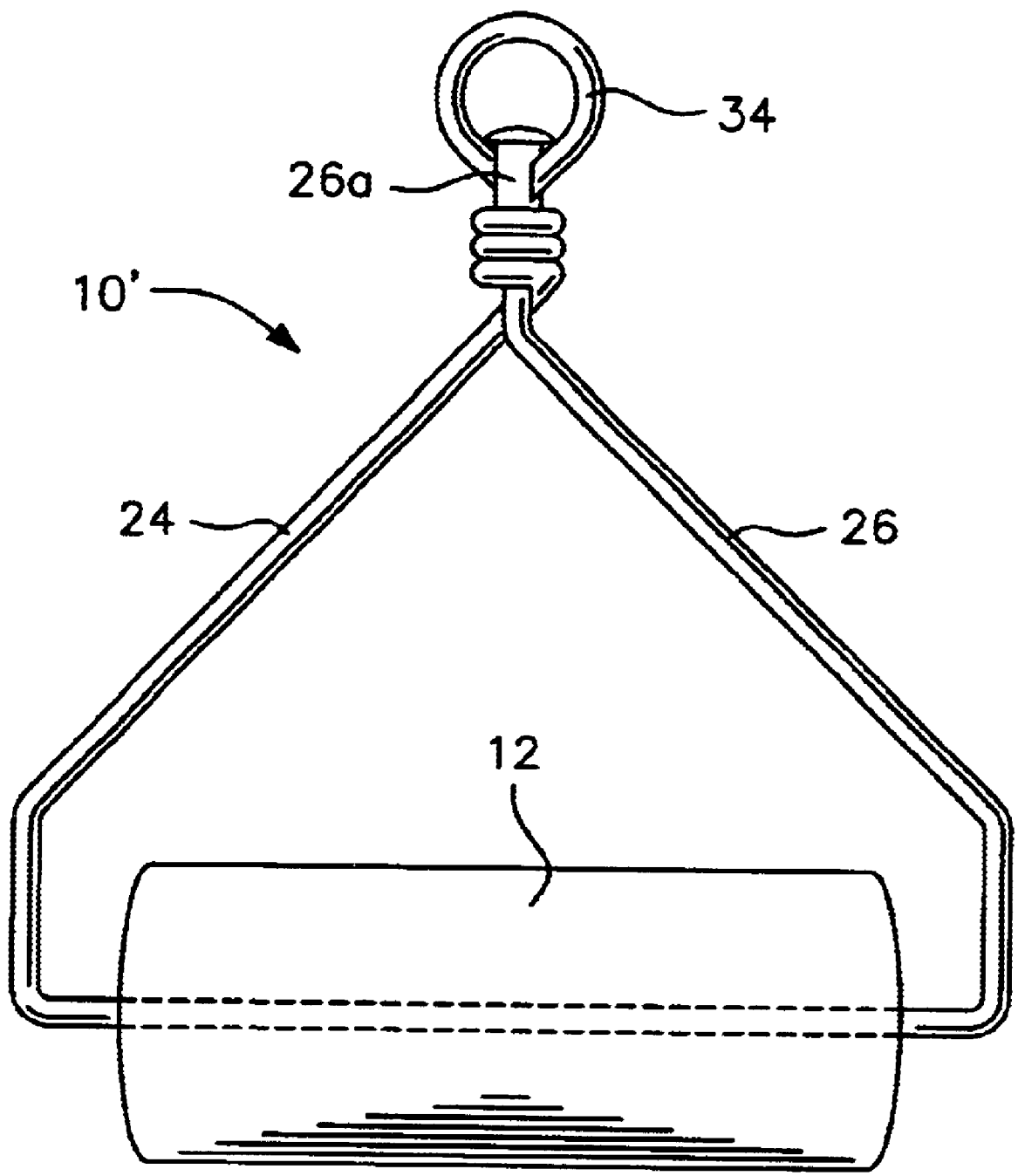
FIG. 6 is a front view of an alternate embodiment of the present invention with a roller weight rotatably mounted on a wire frame terminating in an eyelet for tying of a fishing line.

In an alternate arrangement as shown in FIG. 6, similar reference numerals as used with respect to FIGS. 1 and 2 are used. In this embodiment, the end 26a of arm extension 26 ends by connection with a circular eyelet 34. The advantages of 360 degree rotation between the wire frame and the eyelet are not achieved by this embodiment. However, the connection of the eyelet 34 to a fishing line will provide a significant degree of movement of the roller weight assembly 10' as shown in FIG. 6.

Figure 3:
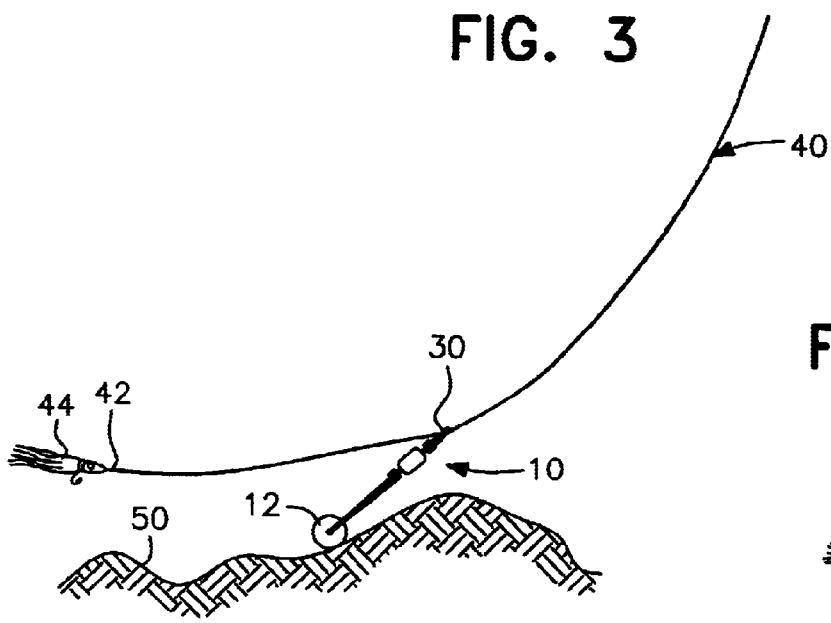
FIG. 3 is a side view of the combination of a roller weight mounted on a wire frame secured to a fishing line by an eyelet with a lead line connecting the eyelet of the wire frame to a fishing lure.
Figure 4:
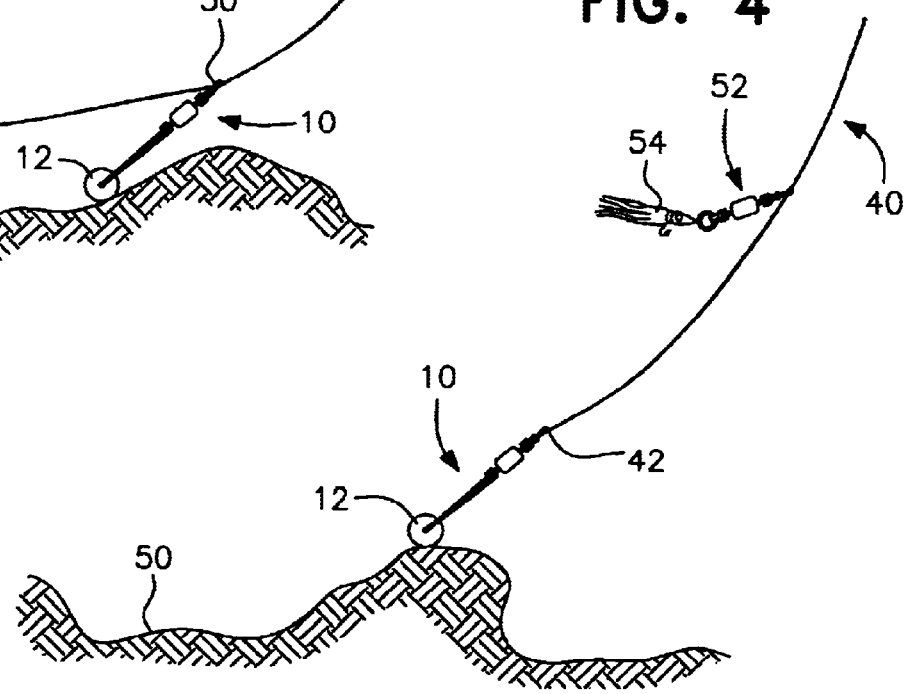
FIG. 4 is an alternate arrangement of mounting a roller weight, wire frame with a fishing lure mounted spaced from the terminal end from the fishing line.
Figure 5:
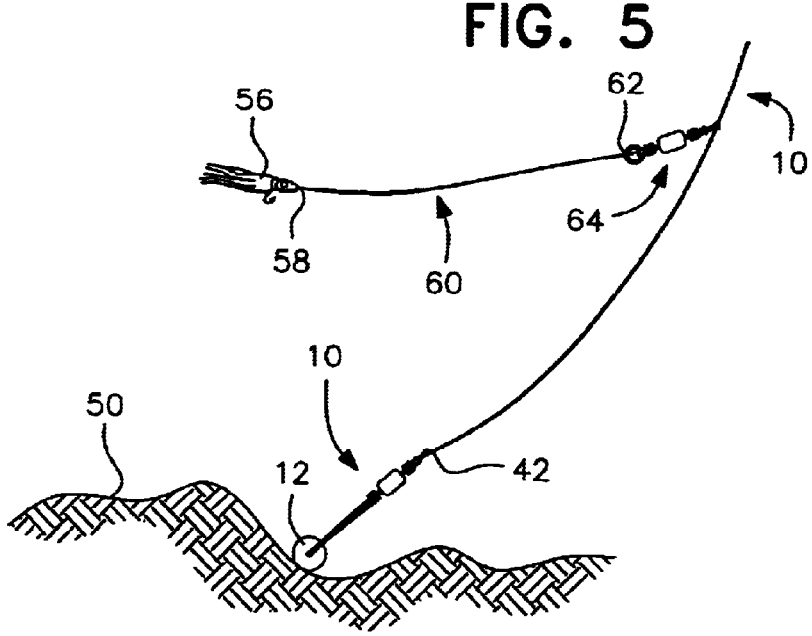
FIG. 5 is an alternate embodiment illustrating the combination of a roller weight secured to a fishing line with a fishing lure secured by a lead line to a swivel mounted on the fishing line.

In use, either the roller weight assembly 10 shown in FIG. 1 or the roller weight assembly 10' as shown in FIG. 6 may be used. In FIGS. 3 through 5, roller weight assembly 10 is shown for illustrative purposes, it being understood that the roller weight assembly 10' could similarly be used.

In FIG. 3, the roller weight assembly 10 is connected to a fishing line 40 adjacent to its terminal end 42 by threading and securing the fishing line to the eyelet assembly 30. Connected to the terminal end 42 of the fishing line 40 is a fishing lure 44. As the fishing line 40 is moved, the roller weight 12 will engage and roll along the uneven terrain of the bottom surface 50 of a body of water.

Similarly, in FIG. 4, the roller weight 10 is connected at the terminal end 42 of fishing line 40. At a distance spaced from the terminal end 42, a swivel connector 52 is connected to the fishing line 40 to rotatably mount a fishing lure 54 to the fishing line 40.

Similar to FIG. 4, in FIG. 5, a fishing lure 56 is located at the terminal end 58 of a lead line 60. The opposite end 62 of the lead line is connected to a swivel connector 64 secured on fishing line 40. Again, the roller weight assembly 10 is located at the terminal end 42 of the fishing line.

In FIGS. 4 and 5, as in FIG. 3, the roller weight 12 allows movement of the roller weight assembly 10 across the uneven terrain of the bottom surface 50 of a body of water.

By the present invention, snagging, hooking or tying up of a fishing line is avoided by the use of a roller weight which is able to traverse a bottom surface of a body of water.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A roller weight assembly for connection to a fishing line, said roller weight assembly comprising:
   a frame having a U-shaped portion including a crosspiece and two arms connected to the crosspiece, an arm extension extending from each of the two arms, the arm extensions intersecting with each other at an angle of 90 degrees,
   a cylindrical weight rotatably mounted through a longitudinal axis of said cylindrical weight on the crosspiece of the U-shaped portion of said frame for 360° of rotation, the two arms of the frame being spaced from sides of the cylindrical weight, and
   an eyelet for connection of the fishing line to the frame, said eyelet being positioned centrally with respect to the U-shaped portion of the frame on which the weight is rotatably mounted so that the weight may roll along an uneven terrain at the bottom of a body of water while avoiding entanglement of the fishing line connected to the eyelet.

2. A roller weight as claimed in claim 1, wherein one of the arm extensions terminates in a swivel connector.

3. A roller weight as claimed in claim 2, wherein the eyelet is connected to the swivel connector.

4. A roller weight as claimed in claim 1, wherein a distance between each of the two arms and the weight is at least 1/16 inch.

5. A roller weight as claimed in claim 1, wherein a distance between an intersection of each of the arms and each of the arm extensions, respectively, and the weight is at least 1/16 inch.

6. A fishing assembly comprising
a frame having a U-shaped portion including a crosspiece and two arms connected to the crosspiece, an arm extension extending from each of the two arms, the arm extensions intersecting with each other at an angle of 90 degrees,
a fishing line,
a fishing lure connected to the fishing line, and
a roller weight assembly connected to the fishing line, said roller weight assembly including a cylindrical roller weight rotatably mounted through a longitudinal axis of said cylindrical weight on the crosspiece of the U-shaped portion of said frame for 360° of rotation, the two arms of the frame being spaced from sides of the cylindrical weight, the fishing line being connected to the roller weight assembly centrally with respect to said roller weight for rolling of the roller weight at the bottom of a body of water while avoiding entanglement.

7. A fishing assembly as claimed in claim 6, wherein the roller weight assembly is connected to the fishing line at a terminal end of the fishing line.

8. A fishing assembly as claimed in claim 6, wherein the roller weight assembly is connected to the fishing line spaced from a terminal end of the fishing line.

9. A roller weight as claimed in claim 6, wherein one of the arm extensions terminates in a swivel connector.

10. A roller weight as claimed in claim 6, wherein a distance between each of the two arms and the weight is at least 1/16 inch.

11. A roller weight as claimed in claim 6, wherein a distance between an intersection of each of the arms and each of the arm extensions, respectively, and the weight is at least 1/16 inch.

* * * * *